(12) United States Patent
Rivolta et al.

(10) Patent No.: US 11,474,621 B2
(45) Date of Patent: Oct. 18, 2022

(54) LOW-POWER TILT-COMPENSATED POINTING METHOD AND CORRESPONDING POINTING ELECTRONIC DEVICE

(71) Applicant: STMicroelectronics S.r.l., Agrate Brianza (IT)

(72) Inventors: Stefano Paolo Rivolta, Desio (IT); Federico Rizzardini, Settimo Milanese (IT); Lorenzo Bracco, Chivasso (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 115 days.

(21) Appl. No.: 16/932,467

(22) Filed: Jul. 17, 2020

(65) Prior Publication Data
US 2021/0034171 A1 Feb. 4, 2021

(30) Foreign Application Priority Data
Jul. 31, 2019 (IT) .................. 102019000013431

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/017* (2013.01); *G06F 3/0383* (2013.01); *G06F 3/03545* (2013.01)

(58) Field of Classification Search
None
See application file for complete search history.

(56) References Cited

U.S. PATENT DOCUMENTS

| 5,902,968 A | 5/1999 | Sato et al. |
| 6,377,906 B1 | 4/2002 | Rowe |
| (Continued) | | |

OTHER PUBLICATIONS

Kok, M. et al., "Using Inertial Sensors for Position and Orientation Estimation," Foundation and Trends in Signal Processing, vol. 11, No. 1-2, 2017, 91 pages.

*Primary Examiner* — Aneeta Yodichkas
(74) *Attorney, Agent, or Firm* — Slater Matsil, LLP (57) ABSTRACT

An embodiment pointing method to generate screen-frame displacement data based on 3D-space movements of a pointing electronic device, comprises receiving a gravity vector (g), having components ($g_x$, $g_y$, $g_z$) corresponding to respective projections of gravity acceleration ($\vec{g}$) on three axes (X, Y, Z) of a 3D reference system associated with the pointing electronic device, generated by a sensor-fusion algorithm from joint processing of an acceleration signal, indicative of acceleration acting on the pointing electronic device along the three axes, and of a gyroscope signal (Gyro), indicative of angular rate of rotation of the pointing electronic device around the three axes. The method further comprises implementing a roll-compensation of the gyroscope signal (Gyro) as a function of the gravity vector (g) to determine a roll-compensated gyroscope signal (Gyro'); and generating the screen-frame displacement data based on the roll-compensated gyroscope signal (Gyro').

20 Claims, 3 Drawing Sheets

(51) Int. Cl.
    *G06F 3/038*     (2013.01)
    *G06F 3/0354*   (2013.01)

(56) References Cited

U.S. PATENT DOCUMENTS

| | | |
|---|---|---|
| 6,993,451 B2 | 1/2006 | Chang et al. |
| 8,614,672 B2 | 12/2013 | Ohta et al. |
| 9,068,843 B1 | 6/2015 | Sohn et al. |
| 9,372,549 B2 | 6/2016 | Meriheina et al. |
| 2009/0009471 A1 | 1/2009 | Yamamoto et al. |
| 2010/0225582 A1* | 9/2010 | Ohta .................... A63F 13/211 |
| | | 345/158 |
| 2011/0163950 A1 | 7/2011 | Ye et al. |
| 2011/0199298 A1 | 8/2011 | Bassompiere et al. |
| 2013/0253821 A1 | 9/2013 | Joseph et al. |
| 2018/0088685 A1 | 3/2018 | Sang et al. |
| 2019/0018499 A1 | 1/2019 | Micali et al. |

\* cited by examiner

LOW-POWER TILT-COMPENSATED POINTING METHOD AND CORRESPONDING POINTING ELECTRONIC DEVICE

CROSS-REFERENCE TO RELATED APPLICATIONS

This application claims the benefit of Italian Application No. 102019000013431, filed on Jul. 31, 2019, which application is hereby incorporated herein by reference.

TECHNICAL FIELD

The present solution relates to a low power tilt-compensated pointing method and to a corresponding electronic device implementing the pointing method.

BACKGROUND

As it is known, pointing algorithms are commonly used in pointer electronic devices and are going to be implemented in smart pens (or digital pens or styluses or smart pencils or similar handheld devices having further and different functions in addition to the pointing function), to be coupled to an electronic apparatus acting as a host apparatus (e.g., a laptop, a tablet, a smart TV, a monitor or a smartphone).

These electronic devices implement a HID (Human Interface Device) pointer (or mouse) interface, or protocol, in order to send displacement information (in particular, information associated with a displacement between a current and a previous position) to the host apparatus, in terms of coordinates in a screen-frame of the same host apparatus. A control unit of the host apparatus is thus able to move a displayed object (e.g., a cursor or the like) on the screen-frame based on the received displacement information.

The pointer device reporting rate (i.e., the time interval between consecutive transmissions of displacement information to the host device) may differ based on application requirements, generally with the aim to achieve a desired trade-off between power consumption and performance.

As it is known, new generation devices (in particular, the above cited smart pens or similar devices) require a very low-power consumption in order to improve battery life.

Two main solutions of pointing algorithms are currently implemented in pointer electronic devices.

A first solution envisages use of only a gyroscope sensor and proper remapping of gyroscope measurements in screen-frame displacements, by selecting two axes of interest from the three measurement axes of the gyroscope sensor. This solution is lightweight and entails low power consumption; however, it is not tilt-compensated, forcing the user to keep the pointer device in a fixed orientation to have a reliable pointing result.

A second solution envisages use of ad-hoc (i.e., purposely developed and implemented) dedicated sensor-fusion algorithms based on measurements from both accelerometer and gyroscope sensors. This solution has the advantage of allowing tilt-compensation of gyroscope measurements using accelerometer measurements; the compensated gyroscope measurements can then be remapped in displacements in the screen frame. However, this kind of solution envisages rather complex computations (e.g., using complex filters, such as a Kalman filter or similar), thus requiring a high computing power and consequently a high power consumption. In addition, since this solution is ad-hoc implemented, it usually cannot be re-used in other applications/contexts.

SUMMARY

As previously discussed, implementation of pointing algorithms in pointer devices, in particular in smart pens or similar devices, entails very stringent requirements, including:
a limited power consumption (due to the fact that size, and consequently battery size, is limited and device battery duration is a key design parameter);
a short execution time; and
a reduced memory occupation, e.g., allowing implementation in BLE (Bluetooth Low Energy) microcontrollers, which allocate most resources to the Bluetooth stack (the memory size available for other algorithms being thus limited).

Moreover, a tilt compensation feature is required (and it is not achievable with gyroscope data only), since the user cannot be forced to maintain a fixed device orientation during its use.

The aim of the present solution is to solve the problems highlighted previously for known pointing algorithms, and to provide an improved pointing solution satisfying the above requirements.

According to the present invention, a pointing method and a corresponding electronic device are consequently provided as defined in the appended claims.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF ILLUSTRATIVE EMBODIMENTS

Figure 1:
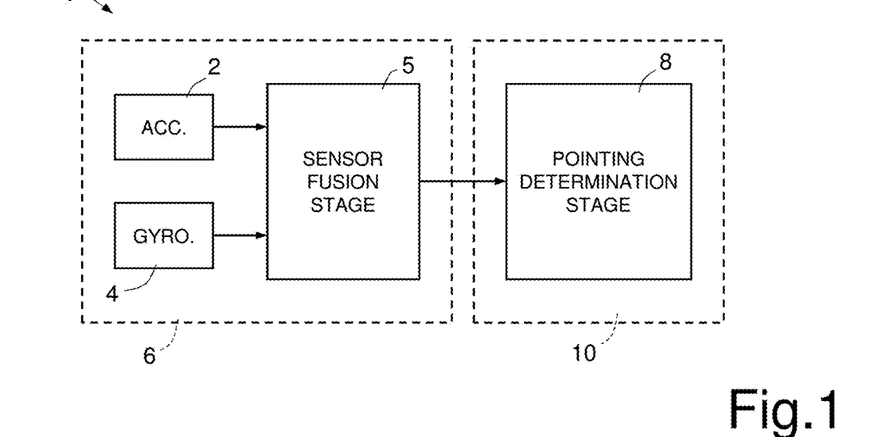
FIG. 1 shows a schematic block diagram of an electronic device implementing a pointing algorithm, according to an embodiment of the present solution.

FIG. 1 shows an electronic device 1 according to an embodiment of the present solution, of the hand-held or portable type, which comprises, within a case or housing thereof:

an accelerometer sensor 2, in particular a MEMS (Micro Electro Mechanical System) triaxial accelerometer, providing an accelerometric signal Acc[x, y, z] indicative of the accelerations acting on the electronic device 1 along the three axes X, Y, Z of a 3D-space inertial reference system associated with the same electronic device 1 (in the following discussion, the axes X, Y, Z of the 3D-space inertial reference system follow the so-called "ENU", East North Up, orientation, according to which axis X points East, axis Y points North, and axis Z points upwards);

a gyroscope sensor 4, in particular a MEMS triaxial gyroscope, providing a gyroscopic signal Gyro[x, y, z] indicative of the angular rate around the three axes X, Y, Z of the 3d-space inertial reference system associated with the electronic device 1; and a sensor-fusion processing stage 5, coupled to the accelerometer sensor 2 and to the gyroscope sensor 4, to receive at its input the accelerometric signal Acc[x, y, z] and the gyroscopic signal Gyro[x, y, z], and configured to jointly process the accelerometric and gyroscopic signals with a generic 6-DoF (six Degrees of Freedom) sensor fusion algorithm (the inputs of the algorithm being the accelerometric and gyroscopic signals), in order to generate at the output a gravity vector estimation.

As it is known, the gravity vector, denoted in the following with g, is an array of three values $[g_x, g_y, g_z]$, which correspond to the respective projections of the gravity acceleration g on the three axes X, Y, Z of the reference system associated with the electronic device 1. The gravity vector is normalized with respect to the value of the acceleration of gravity (about 9.8 m/s$^2$), thus having a unitary module.

The sensor-fusion stage 5 implements any suitable generic sensor-fusion filter algorithm, for example a complementary-filter algorithm, to combine the accelerometric signal Acc[x, y, z] and the gyroscopic signal Gyro[x, y, z] and to generate at the output the gravity vector g (it is underlined, in any case, that the present disclosure is not to be intended limited to a particular implementation of the sensor-fusion stage 5, which may be of any known type allowing to generate at the output the gravity vector g based on accelerometer and gyroscope input signals).

Figure 2:
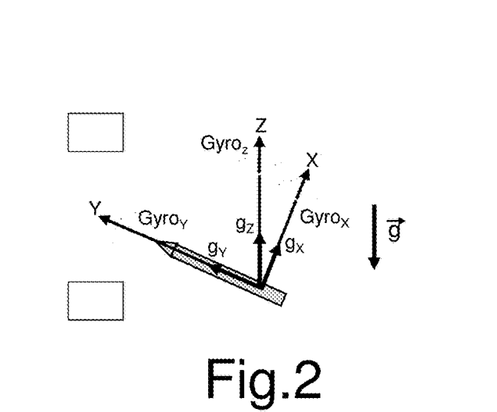
FIG. 2 is a schematic depiction of the electronic device and corresponding gyroscopic signal and gravity vector components.

FIG. 2 schematically shows the electronic device 1, the three axes X, Y and Z of the associated reference system, the gyroscopic signal Gyro[x, y, z] and gravity vector components $g_x$, $g_y$, $g_z$ along the same three axes X, Y and Z, according to the above-referred ENU orientation. In particular, axis Y represents the axis of longitudinal extension of the electronic device 1; axis X represents a transversal axis, with respect to the same longitudinal extension; and axis Z represents a vertical axis, orthogonal to the horizontal plane defined by the X and Y axes.

In a way not directly related to the present solution, it is noted that the sensor-fusion processing stage 5 may also be configured to determine, based on the joint processing of the same accelerometric signal Acc[x, y, z] and gyroscopic signal Gyro[x, y, z], the angular position, or orientation, of the electronic device 1 in the three-dimensional space defined by the three axes X, Y, Z and to generate at the output a corresponding attitude (or orientation) quaternion q. In particular, and in a known manner, the attitude quaternion q is a 6-DoF (Degree of Freedom) quaternion containing information about the orientation of the electronic device 1 in the 3d-space and can be represented as an array of four real numbers $[q_0, q_1, q_2, q_3]$: first, second and third vector components $q_1, q_2, q_3$ define a versor in the 3d-space and angular component $q_0$ defines an angular rotation about the same versor, thereby defining the orientation of the electronic device 1.

According to a possible embodiment, as schematically shown in FIG. 1, the accelerometer sensor 2, the gyroscope sensor 4 and the sensor-fusion stage 5 may be implemented in a same hardware module 6 (in particular in a same packaged chip integrating both accelerometer and gyroscope sensors 2, 4 and the sensor-fusion stage 5, e.g., made as an ASIC—Application Specific Integrated Circuit).

The electronic device 1 further comprises a pointing determination stage 8, coupled to the sensor-fusion processing stage 5 and configured to perform a pointing algorithm for translating the movements of the electronic device 1 in the 3d-space into displacements in a bidimensional screen frame (i.e., within a displayed area of a host apparatus coupled to the electronic device 1) in few and easy-to-compute operations (requiring a low energy, e.g., in the order of µA).

According to a possible embodiment, as schematically shown in the same FIG. 1, the pointing determination stage 8 may be implemented in a control unit 10, having a microcontroller (or similar processing or computing unit) and a suitable non-volatile memory storing computing instructions to execute the pointing algorithm and generate at the output displacement information to be received by the coupled host apparatus to implement a user interface (for example for moving a cursor or a similar displayed element on the screen of the same coupled host apparatus).

In this embodiment, the pointing determination stage 8 constitutes a software add-on, in addition to the hardware module 6, envisaging, as will be discussed in detail hereinafter, minimal use of resources.

The control unit 10 implementing the pointing determination stage 8 may be a dedicated control unit, or may also have other functions, e.g., being a BLE (Bluetooth Low Energy) control unit implementing, possibly among other features, a Bluetooth low-power wireless communication between the electronic device 1 and the coupled host apparatus.

Figure 3:
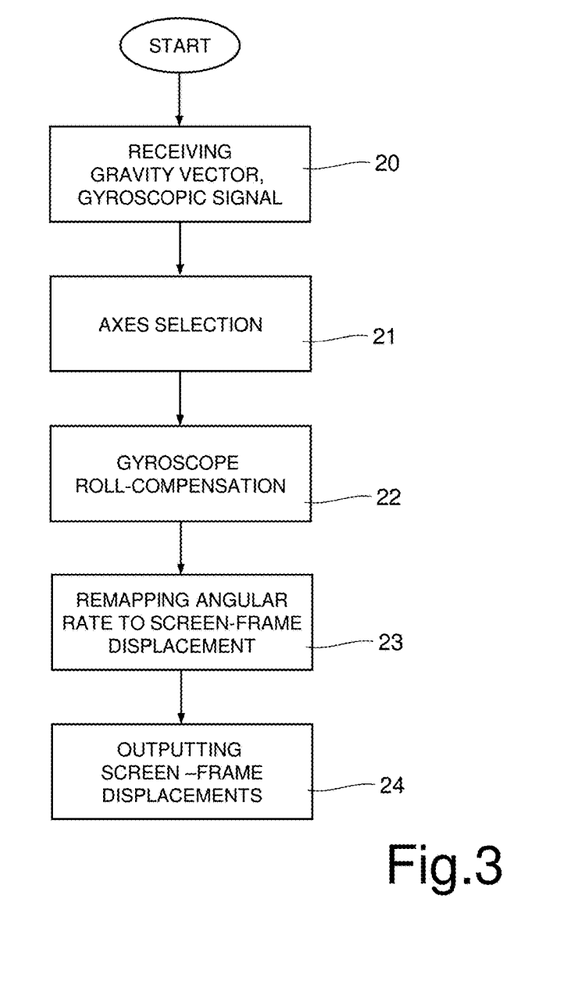
FIG. 3 is a schematic flow chart of operations performed according to the pointing algorithm.

In more detail and with reference also to FIG. 3, the pointing determination stage 8 receives as the inputs of the pointing algorithm, as shown at step 20: from the sensor-fusion processing stage 5, the gravity vector $g[g_x, g_y, g_z]$ (generated by the same sensor-fusion processing stage 5 with a 6-DoF sensor-fusion algorithm based on the accelerometric and gyroscopic signals); and the same gyroscopic signal Gyro[x, y, z].

As shown at step 21, the pointing determination stage 8 then performs an operation of axes selection.

In particular, in order to avoid waste of resources, one gyroscope axis (the one representing the roll) can be removed from the subsequent computations: in the case of using a ENU reference system, the Y axis can indeed be ignored (reference can again be made to FIG. 2: the roll rotation of the electronic device 1 around the Y axis does not participate in the pointing operation and thus in the determination of corresponding displacements in the screen frame).

As shown at step 22, the pointing determination stage 8 performs a one-axis roll (or tilt) compensation of the gyroscopic signal Gyro[x, y, z] received at its input, in order to provide a natural user experience with any orientation of the electronic device 1 (i.e., independent from any rotation of the same electronic device 1 around its longitudinal axis, the Y axis in the above defined ENU orientation). It is again noted that in the electronic device 1 the roll axis is the one not used for screen-frame displacement computation.

In order to perform the roll compensation operation, the input gyroscopic signal Gyro is back-rotated using a roll rotation matrix, according to the following expression:

$$\begin{bmatrix} Gyro'_x \\ Gyro'_y \\ Gyro'_z \end{bmatrix} = \begin{bmatrix} \cos\theta & 0 & -\sin\theta \\ 0 & 1 & 0 \\ \sin\theta & 0 & \cos\theta \end{bmatrix}^{-1} \begin{bmatrix} Gyro_x \\ Gyro_y \\ Gyro_z \end{bmatrix}$$

where θ is the roll angle, Gyro is the input gyroscopic signal defined by vector [$Gyro_x$, $Gyro_y$, $Gyro_z$] and Gyro' is the roll-compensated gyroscopic signal defined by vector [$Gyro'_x$, $Gyro'_y$, $Gyro'_z$].

According to an aspect of the present solution, instead of computing the roll angle θ and calculating cos θ and sin θ (with computationally expensive trigonometric function), the same quantities are determined based on a processed gravity vector g'.

In particular, the processed gravity vector g' corresponds to the 6-DoF gravity vector g, re-normalized using X and Z axes only:

$$g' = \begin{bmatrix} g'_x \\ 0 \\ g'_z \end{bmatrix}$$

wherein:

$$g'_x = \frac{g_x}{\sqrt{g_x^2 + g_z^2}}$$

$$g'_z = \frac{g_z}{\sqrt{g_x^2 + g_z^2}}$$

$g'_x$ and $g'_z$ being the components along the X axis and, respectively, along the Z axis of the processed gravity vector g'.

According to the above expressions, it follows that:

sin θ=−$g'_x$ cos θ=$g'_z$ $\sin^2\theta + \cos^2\theta = 1$

Substituting the above expressions for cos θ and sin θ in the above back-rotation expression and discarding the Y-axis component as specified above (referring to the axes selection operation at step 21), the components of the roll-compensated gyroscopic signal Gyro' along the X and Z axes can be expressed as:

$Gyro'_x = Gyro_x \cdot g'_z - Gyro_z \cdot g'_x$ $Gyro'_z = Gyro_x \cdot g'_x + Gyro_z \cdot g'_z$ As shown at step 23, the pointing determination stage 8 then implements a remapping of the angular rate of the electronic device 1 into displacements into the screen-frame space coordinates, denoted in the following as [x', y'].

Figure 4A:
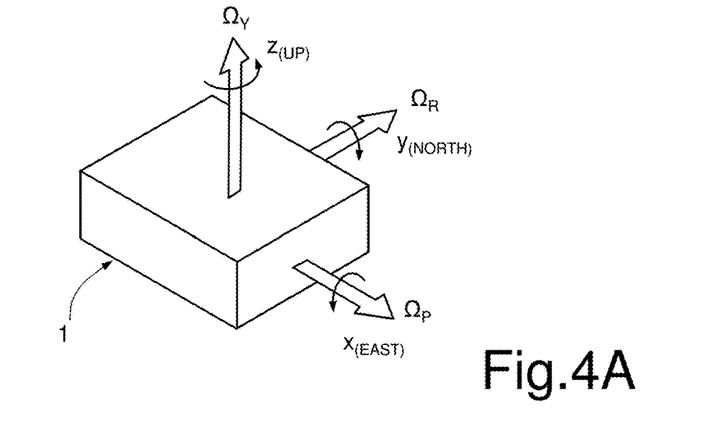
FIG. 4A is a schematic depiction of the electronic device and corresponding angular rates.
Figure 4B:
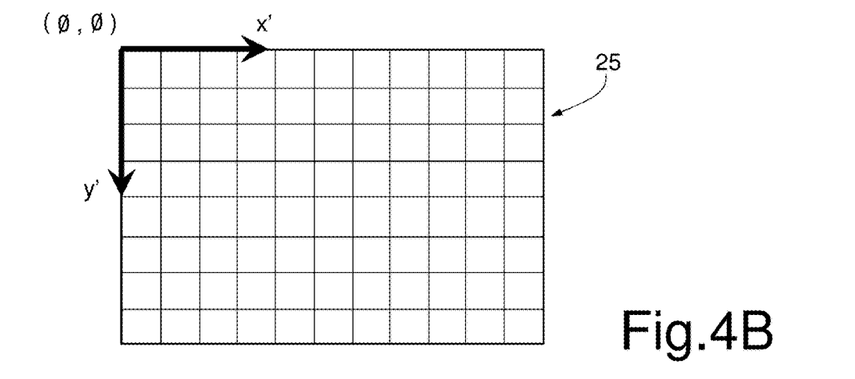
FIG. 4B is a schematic depiction of a screen-frame where displacements generated at the output by the pointing algorithm are performed.

In this respect, FIG. 4A schematically shows the electronic device 1 and its angular rates, considering the ENU device orientation: the roll rate $\Omega_R$ around the Y (North) axis; the pitch rate $\Omega_P$ around the X (East) axis; and the yaw rate $\Omega_Y$ around the Z (Up) axis. FIG. 4B schematically shows the screen frame, here denoted with 25, having a bidimensional surface defined by coordinates x', y' (with the origin (0,0) at the upper left corner).

In this embodiment, axes remapping can thus be implemented as follows:

x'=−$Gyro'_z$·σ y'=−$Gyro'_x$·σ

The above expressions corresponds to selection of the compensated yaw rate (i.e., the component of the roll-compensated gyroscopic signal Gyro' along the Z axis) as the x' displacement in the screen frame; and the compensated pitch rate (i.e., the component of the roll-compensated gyroscopic signal Gyro' along the X axis) as the y' displacement in the same screen frame; the two values are multiplied by −1 in order to be correctly remapped into screen space, as clearly seen in FIG. 4B.

Moreover, multiplication by a scale factor σ, being indicative of the pointer sensitivity, is applied in order to get a desired pointer speed, i.e., a desired movement speed of the cursor or other element displayed on the screen and moving according to the displacement information provided by the electronic device 1 to the host apparatus.

As shown at step 24, the pointing determination stage 8 then outputs the computed [x', y'] values of displacement and send these displacement information to the host apparatus (according to a suitable HID protocol data communication).

If required by the HID protocol, the computed [x', y'] values of displacement may be clamped to a respective maximum value allowed (e.g., in the case of an 8-bit representation, values x' and y' may be clamped to ±127).

Figure 5:
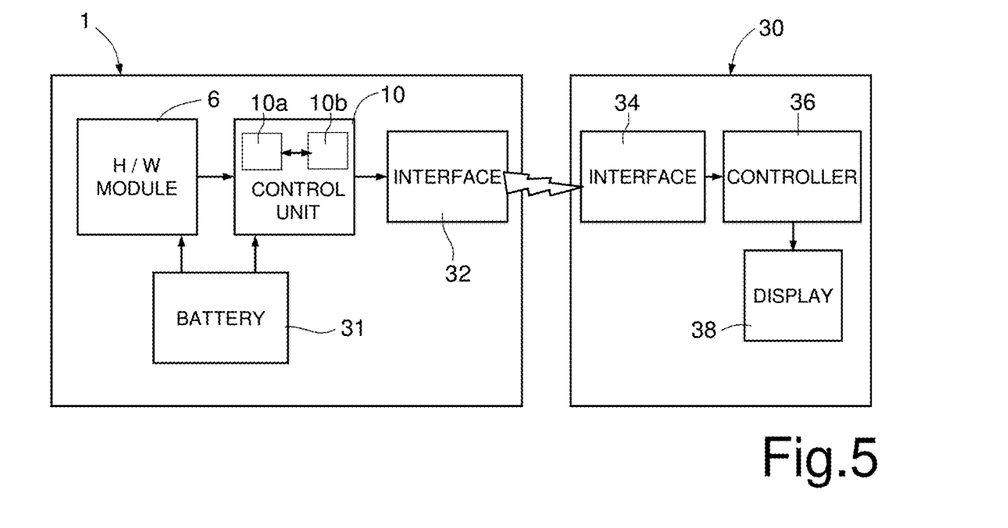
FIG. 5 is a schematic block diagram of a system comprising the electronic device of FIG. 1 and a host apparatus.

FIG. 5 shows the electronic device 1, for example a smart pen or stylus, communicatively coupled to a host apparatus 30, for example a smartphone, a phablet or a tablet.

As shown in the same FIG. 5, the electronic device 1 may further comprise: a battery 31, providing a power supply to the hardware module 6 (including the accelerometer sensor 2, the gyroscope sensor 4 and the sensor-fusion stage 5) and to the control unit 10 (implementing the pointing determination stage 8); and a communication interface 32, designed for wireless communication to the host apparatus 30.

The same host apparatus 30 may comprise: a respective communication interface 34, to communicate with the communication interface 32 of the electronic device 1; a main controller 36, e.g., a microprocessor unit; and a display 38, defining the screen frame 25, on which movement of a cursor or other similar displayed element is controlled by the main controller 36 according to displacement information provided by the electronic device 1.

Figure 6A:
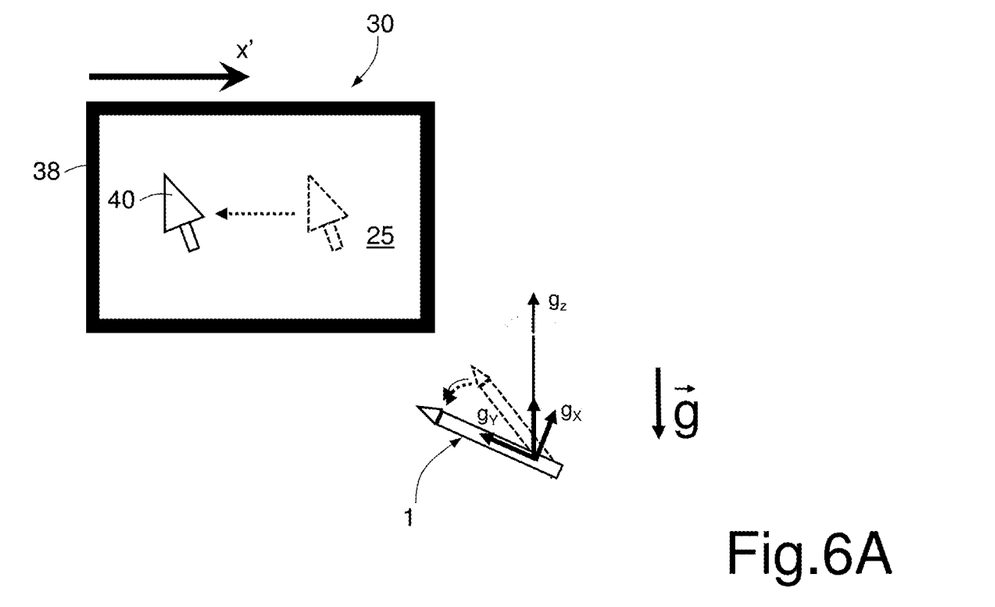
FIGS. 6A and 6B are schematic depictions of the correspondence of respective movements of the electronic device and displacements in a display of the host apparatus.

In this respect, FIG. 6A shows schematically how a rotation of the electronic device 1 (in this case, a smart or digital pen) with a positive angular rate about the Z axis, $g_z$ (i.e., a rotation from east to west, in the "ENU" reference) corresponds to a displacement of a cursor 40 in the screen frame 25 of the display 38 of the host apparatus 30, in particular a leftward displacement along the x' axis (i.e., a negative x' displacement).

Figure 6B:
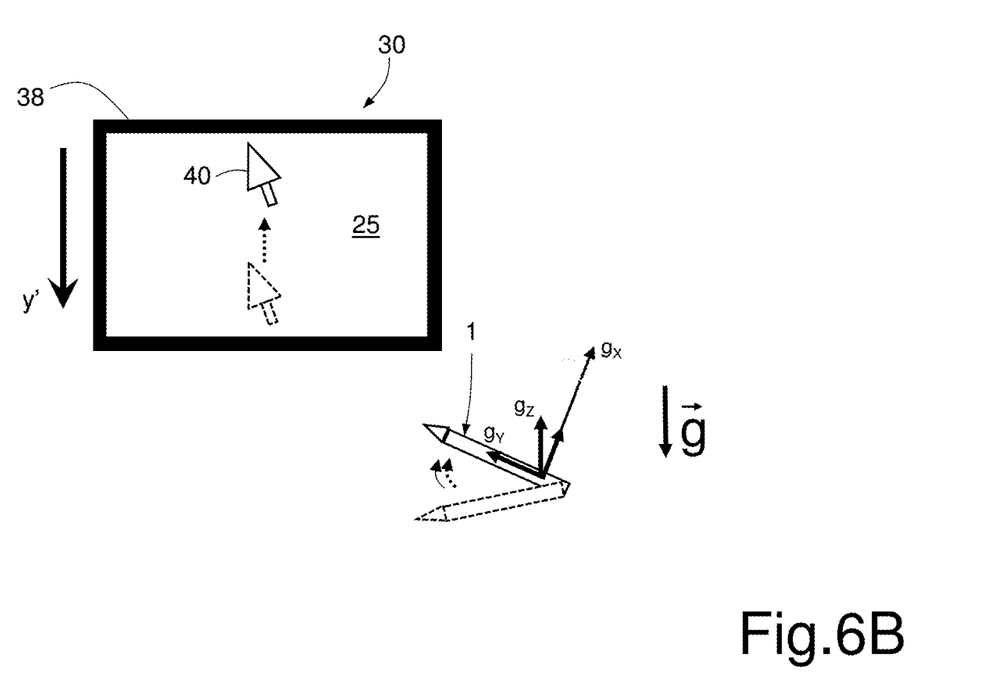

FIG. 6B shows schematically how a rotation of the electronic device 1 (also in this case, a smart or digital pen) with a positive angular rate about the X axis, $g_x$ (i.e., a rotation from down to up, in the "ENU" reference) corresponds to a displacement of the cursor 40 in the screen frame 25 of the display 38 of the host apparatus 30, in particular an upward displacement along the y' axis (i.e., a negative y' displacement).

It is also evident that, in addition to the displacement information, any kind of further information may be communicated between the electronic device 1 and the host apparatus 30.

The advantages of the solution proposed are clear from the foregoing description.

In any case, it is again underlined that the proposed solution, instead of developing a specific ad-hoc sensor fusion algorithm from accelerometer and gyroscope signals, adds a low-power computation in addition to a generic sensor-fusion algorithm providing a 6-DoF gravity vector, in order to determine the screen-frame displacement as a function of the same gravity vector.

Advantageously, the generic sensor-fusion algorithm, used as the starting point of the pointing algorithm, can be re-used in other projects/applications.

Moreover, the gravity vector, representing the input of the algorithm, inherently allows rejection of linear accelerations, without use of dedicated low pass filters (with the associated drawbacks of bandwidth and latency).

The pointing algorithm performs a translation from the 3d-space to the screen-frame in few easy-to-compute operations, requiring a low-power, e.g., in the order of a few μA, in addition to MEMS sensor power consumption, and entails a very short operating time and a reduced memory usage.

Moreover, the Applicant has realized that convergence-time issues that may affect the gravity vector estimation, which is used to roll-compensate the gyroscope signal Gyro, may only cause a slight roll-compensation error but not the drift movement of the displayed cursor on the screen frame when the pointer electronic device 1 stops from a movement condition (as it may be the case for known pointing solutions).

Moreover, the Applicant has realized that accuracy is not dependent by the initial position or by a drift over time of the yaw estimation of the electronic device 1 (as it may be the case for known pointing solutions), due to the fact that only a roll-compensation operation is applied.

Finally, it is clear that modifications and variations may be made to what has been described and illustrated herein, without thereby departing from the scope of the present invention, as defined in the annexed claims.

In particular, it is underlined that the pointing determination stage 8 could also be implemented as a hardware module and be integrated in the same packaged chip with the MEMS inertial sensors (the accelerometer and gyroscope and possibly further sensors, such as a magnetometer) and with the related processing circuit.

Moreover, it is again underlined that the electronic device 1 may be a dedicated pointer device or may also have additional functions, besides the implementation of the pointing algorithm (as is the case for a smart pen or similar hand-held electronic device).

What is claimed is:

1. A pointing method comprising:
   receiving a gravity vector (g), having components ($g_x$, $g_y$, $g_z$) corresponding to respective projections of gravity acceleration ($\vec{g}$) on three axes (X, Y, Z) of a three dimensional (3D) reference system associated with a pointing electronic device, generated by a sensor-fusion algorithm from joint processing of an acceleration signal, indicative of acceleration acting on the pointing electronic device along the three axes (X, Y, Z) of the 3D reference system, and of a gyroscope signal (Gyro), indicative of angular rate of rotation of the pointing electronic device around the three axes of the 3D reference system;
   implementing a roll-compensation of the gyroscope signal (Gyro) as a function of the gravity vector (g) to determine a roll-compensated gyroscope signal (Gyro'); and
   generating screen-frame displacement data for a screen frame based on the roll-compensated gyroscope signal (Gyro').

2. The pointing method according to claim 1, wherein implementing the roll-compensation of the gyroscope signal (Gyro) comprises applying a roll-rotation matrix to the gyroscope signal (Gyro), to determine the roll-compensated gyroscope signal (Gyro'), and wherein the roll-rotation matrix is determined based on components ($g'_x$, $g'_z$) of a re-normalized gravity vector (g') along a first axis (X) and, respectively, along a second axis (Z) of the 3D reference system.

3. The pointing method according to claim 2, wherein the roll-compensated gyroscope signal (Gyro') is determined based on the following expression:

$$\begin{bmatrix} Gyro'_x \\ Gyro'_y \\ Gyro'_z \end{bmatrix} = \begin{bmatrix} \cos\theta & 0 & -\sin\theta \\ 0 & 1 & 0 \\ \sin\theta & 0 & \cos\theta \end{bmatrix}^{-1} \begin{bmatrix} Gyro_x \\ Gyro_y \\ Gyro_z \end{bmatrix}$$

where θ is a roll rotation angle, Gyro is the gyroscope signal with components [$Gyro_x$, $Gyro_y$, $Gyro_z$] and Gyro' is the roll-compensated gyroscope signal with components [$Gyro'_x$, $Gyro'_y$, $Gyro'_x$] around the three axes (X, Y, Z) of the 3D reference system associated with the pointing electronic device; and wherein the quantities cos θ and sin θ are determined according to the following expressions:

$$\sin\theta = -g'_x$$

$$\cos\theta = g'_z$$

where $g'_x$ and $g'_z$ are the components of the re-normalized gravity vector (g') along a first axis (X) and, respectively, along a second axis (Z) of the 3D reference system.

4. The pointing method according to claim 3, wherein the 3D reference system further comprises a third axis (Y), being an axis of longitudinal extension of the pointing electronic device; the first axis (X) being a transversal axis, with respect to the longitudinal extension of the pointing electronic device; and the second axis (Z) being a vertical axis, orthogonal to a plane defined by the first (X) and third (Y) axes; and wherein the re-normalized gravity vector (g') corresponds to the gravity vector (g), re-normalized using the first (X) and the second (Z) axes:

$$g' = \begin{bmatrix} g'_x \\ 0 \\ g'_z \end{bmatrix}$$

wherein:

$$g'_x = \frac{g_x}{\sqrt{g_x^2 + g_z^2}}$$

$$g'_z = \frac{g_z}{\sqrt{g_x^2 + g_z^2}}$$

$g_x$, $g_z$ and $g'_x$, $g'_z$ being the components along the first axis (X) and along the second axis (Z) of the gravity vector (g) and, respectively, of the re-normalized gravity vector (g').

5. The pointing method according to claim 3, wherein the component of the gyroscope signal (Gyro) around a third axis (Y) of the 3D reference system associated with the pointing electronic device is discarded for the determination of the roll-compensated gyroscope signal (Gyro'), which is thus given by:

$$\text{Gyro}'_x = \text{Gyro}_x \cdot g'_z - \text{Gyro}_z \cdot g'_x$$

$$\text{Gyro}'_z = \text{Gyro}_x \cdot g'_x + \text{Gyro}_z \cdot g'_z$$

where $\text{Gyro}_x$, $\text{Gyro}'_x$ and $\text{Gyro}_z$, $\text{Gyro}'_z$ are the components of the gyroscopic signal (Gyro) and roll-compensated gyroscopic signal (Gyro') around the first axis (X) and, respectively, around the second axis (Z) of the 3D reference system associated with the pointing electronic device.

6. The pointing method according to claim 5, wherein generating the screen-frame displacement data based on the roll-compensated gyroscopic signal (Gyro') comprises selecting the component of the roll-compensated gyroscopic signal (Gyro') around the second axis (Z), as a displacement along a first direction (x') in the screen frame; and the component of the roll-compensated gyroscopic signal (Gyro') around the first axis (X), as a displacement along a second direction (y') in the screen frame, orthogonal to the first direction (x') according to the following expressions:

$$x' = -\text{Gyro}'_z \cdot \sigma$$

$$y' = -\text{Gyro}'_x \cdot \sigma$$

wherein x' is the displacement along the first direction in the screen frame, y' is the displacement along the second direction in the screen frame, and σ is a scale factor.

7. A pointing electronic device, comprising a pointing determination stage configured to:

receive a gravity vector (g), having components ($g_x$, $g_y$, $g_z$) corresponding to respective projections of gravity acceleration ($\vec{g}$) on three axes (X, Y, Z) of a three dimensional (3D) reference system associated with the pointing electronic device, generated by a sensor-fusion algorithm from joint processing of an acceleration signal, indicative of acceleration acting on the pointing electronic device along the three axes (X, Y, Z) of the 3D reference system, and of a gyroscope signal (Gyro), indicative of angular rate of rotation of the pointing electronic device around the three axes (X, Y, Z) of the 3D reference system;

implement a roll-compensation of the gyroscope signal (Gyro) as a function of the gravity vector (g) to determine a roll-compensated gyroscope signal (Gyro'); and generate screen-frame displacement data for a screen frame based on the roll-compensated gyroscope signal (Gyro').

8. The pointing electronic device according to claim 7, further comprising:

an accelerometer sensor, configured to generate the acceleration signal, indicative of the acceleration acting on the pointing electronic device along the three axes (X, Y, Z) of the 3D reference system associated with the pointing electronic device;

a gyroscope sensor, configured to generate the gyroscope signal (Gyro), indicative of the angular rate of rotation of the pointing electronic device around the three axes (X, Y, Z) of the 3D reference system associated with the pointing electronic device; and a sensor-fusion processing stage, configured to jointly process the acceleration signal and the gyroscope signal (Gyro), to generate the gravity vector (g).

9. The pointing electronic device according to claim 8, wherein the accelerometer sensor, the gyroscope sensor and the sensor-fusion processing stage are integrated in a same hardware module; and the pointing electronic device further comprises a control unit, coupled to the hardware module and having a processing unit and a non-volatile memory storing computing instructions to implement the pointing determination stage.

10. The pointing electronic device according to claim 9, further comprising a communication interface configured to transmit the screen-frame displacement data to a host apparatus having a display defining the screen frame, wherein the screen-frame displacement data is configured to control movement of a displayed element on the screen frame.

11. The pointing electronic device according to claim 7, wherein the pointing determination stage is configured to implement the roll-compensation of the gyroscope signal (Gyro) applying a roll-rotation matrix to the gyroscope signal (Gyro), to determine the roll-compensated gyroscope signal (Gyro'), and wherein the roll-rotation matrix is determined based on components ($g'_z$, $g'_z$) of a re-normalized gravity vector (g') along a first axis (X) and, respectively, along a second axis (Z) of the 3D reference system.

12. The pointing electronic device according to claim 11, wherein the roll-compensated gyroscope signal (Gyro') is determined based on the following expression:

$$\begin{bmatrix} Gyro'_x \\ Gyro'_y \\ Gyro'_z \end{bmatrix} = \begin{bmatrix} \cos\theta & 0 & -\sin\theta \\ 0 & 1 & 0 \\ \sin\theta & 0 & \cos\theta \end{bmatrix}^{-1} \begin{bmatrix} Gyro_x \\ Gyro_y \\ Gyro_z \end{bmatrix}$$

where θ is a roll rotation angle, Gyro is the gyroscope signal with components [$Gyro_x$, $Gyro_y$, $Gyro_z$] and Gyro' is the roll-compensated gyroscope signal with components [$Gyro'_x$, $Gyro'_y$, $Gyro'_z$] around the three axes (X, Y, Z) of the 3D reference system associated with the pointing electronic device; and wherein the quantities cos θ and sin θ are determined according to the following expressions:

$$\sin\theta = -g'_x$$

$$\cos\theta = g'_z$$

where $g'_x$ and $g'_z$ are the components of the re-normalized gravity vector (g') along a first axis (X) and, respectively, along a second axis (Z) of the 3D reference system.

13. The pointing electronic device according to claim 12, wherein the 3D reference system further comprises a third axis (Y), being an axis of longitudinal extension of the pointing electronic device; the first axis (X) being a transversal axis, with respect to the longitudinal extension of the pointing electronic device; and the second axis (Z) being a vertical axis, orthogonal to a plane defined by the first (X) and third (Y) axes; and wherein the pointing determination stage is configured to determine the re-normalized gravity vector (g') corresponding to the gravity vector (g) re-normalized using the first (X) and the second (Z) axes:

$$g' = \begin{bmatrix} g'_x \\ 0 \\ g'_z \end{bmatrix}$$

wherein:

$$g'_x = \frac{g_x}{\sqrt{g_x^2 + g_z^2}}$$

$$g'_z = \frac{g_z}{\sqrt{g_x^2 + g_z^2}}$$

$g_x$, $g_z$ and $g'_x$, $g'_z$ being the components along the first axis (X) and along the second axis (Z) of the gravity vector (g) and, respectively, of the re-normalized gravity vector (g').

14. The pointing electronic device according to claim 12, wherein the pointing determination stage is configured to discard the component of the gyroscope signal (Gyro) referred to a third axis (Y) of the 3D reference system associated with the pointing electronic device for the determination of the roll-compensated gyroscope signal (Gyro'), which is thus given by:

Gyro'$_x$=Gyro$_x$·g'$_z$−Gyro$_z$·g'$_z$

Gyro'$_z$=Gyro$_x$·g'$_x$+Gyro$_z$·g'$_z$ where Gyro$_x$, Gyro'$_x$ and Gyro$_z$, Gyro'$_z$ are the components of the gyroscopic signal (Gyro) and roll-compensated gyroscopic signal (Gyro') around the first axis (X) and, respectively, around the second axis (Z) of the 3D reference system associated with the pointing electronic device.

15. The pointing electronic device according to claim 14, wherein the pointing determination stage is configured to select the component of the roll-compensated gyroscopic signal (Gyro') around the second axis (Z), as a displacement along a first direction (x') in the screen frame; and the component of the roll-compensated gyroscopic signal (Gyro') around the first axis (X), as a displacement along a second direction (y') in the screen frame, orthogonal to the first direction (x') according to the following expressions:

x'=−Gyro'$_z$·σ y'=−Gyro'$_x$·σ wherein x' is the displacement along the first direction in the screen frame, y' is the displacement along the second direction in the screen frame, and σ is a scale factor.

16. An electronic system comprising:
a pointing electronic device, comprising a pointing determination stage configured to:
receive a gravity vector (g), having components ($g_x$, $g_y$, $g_z$) corresponding to respective projections of gravity acceleration ($\vec{g}$) on three axes (X, Y, Z) of a three dimensional (3D) reference system associated with the pointing electronic device, generated by a sensor-fusion algorithm from joint processing of an acceleration signal, indicative of acceleration acting on the pointing electronic device along the three axes (X, Y, Z) of the 3D reference system, and of a gyroscope signal (Gyro), indicative of angular rate of rotation of the pointing electronic device around the three axes (X, Y, Z) of the 3D reference system;
implement a roll-compensation of the gyroscope signal (Gyro) as a function of the gravity vector (g) to determine a roll-compensated gyroscope signal (Gyro'); and
generate screen-frame displacement data for a screen frame based on the roll-compensated gyroscope signal (Gyro'); and
a host apparatus coupled to the pointing electronic device, wherein the host apparatus comprises:
a communication interface configured to communicate with the pointing electronic device and receive the screen-frame displacement data;
a display defining the screen frame; and
a main controller configured to control movement of a displayed element according to the screen-frame displacement data received from the electronic device.

17. The electronic system according to claim 16, wherein the pointing electronic device further comprises:
an accelerometer sensor, configured to generate the acceleration signal, indicative of the acceleration acting on the pointing electronic device along the three axes (X, Y, Z) of the 3D reference system associated with the pointing electronic device;
a gyroscope sensor, configured to generate the gyroscope signal (Gyro), indicative of the angular rate of rotation of the pointing electronic device around the three axes (X, Y, Z) of the 3D reference system associated with the pointing electronic device; and
a sensor-fusion processing stage, configured to jointly process the acceleration signal and the gyroscope signal (Gyro), to generate the gravity vector (g).

18. The electronic system according to claim 17, wherein the accelerometer sensor, the gyroscope sensor and the sensor-fusion processing stage are integrated in a same hardware module; and the pointing electronic device further comprises a control unit, coupled to the hardware module and having a processing unit and a non-volatile memory storing computing instructions to implement the pointing determination stage.

19. The electronic system according to claim 16, wherein the pointing determination stage is configured to implement the roll-compensation of the gyroscope signal (Gyro) applying a roll-rotation matrix to the gyroscope signal (Gyro), to determine the roll-compensated gyroscope signal (Gyro'), and wherein the roll-rotation matrix is determined based on components ($g'_x$, $g'_z$) of a re-normalized gravity vector (g') along a first axis (X) and, respectively, along a second axis (Z) of the 3D reference system.

20. The electronic system according to claim 19, wherein the roll-compensated gyroscope signal (Gyro') is determined based on the following expression:

$$\begin{bmatrix} Gyro'_x \\ Gyro'_y \\ Gyro'_z \end{bmatrix} = \begin{bmatrix} \cos\theta & 0 & -\sin\theta \\ 0 & 1 & 0 \\ \sin\theta & 0 & \cos\theta \end{bmatrix}^{-1} \begin{bmatrix} Gyro_x \\ Gyro_y \\ Gyro_z \end{bmatrix}$$

where θ is a roll rotation angle, Gyro is the gyroscope signal with components [Gyro$_x$, Gyro$_y$, Gyro$_z$] and Gyro' is the roll-compensated gyroscope signal with components [Gyro'$_x$, Gyro'$_y$, Gyro'$_x$] around the three axes (X, Y, Z) of the 3D reference system associated with the pointing electronic device; and wherein the quantities cos θ and sin θ are determined according to the following expressions:

$$\sin \theta = -g'_x$$

$$\cos \theta = g'_z$$

where $g'_x$ and $g'_z$ are the components of the re-normalized gravity vector (g') along a first axis (X) and, respectively, along a second axis (Z) of the 3D reference system.

\* \* \* \* \*